W. C. HOLLISTER.
RULED LINOTYPE FORM AND MEANS FOR PRODUCING SAME.
APPLICATION FILED JAN. 29, 1918.

1,349,720.

Patented Aug. 17, 1920.
4 SHEETS—SHEET 1.

Witnesses
W. F. Kilroy
Harry R. L. White

Inventor
William C. Hollister,
By Edward Jay Wilson Atty.

W. C. HOLLISTER.
RULED LINOTYPE FORM AND MEANS FOR PRODUCING SAME.
APPLICATION FILED JAN. 29, 1918.
1,349,720.
Patented Aug. 17, 1920.
4 SHEETS—SHEET 2.
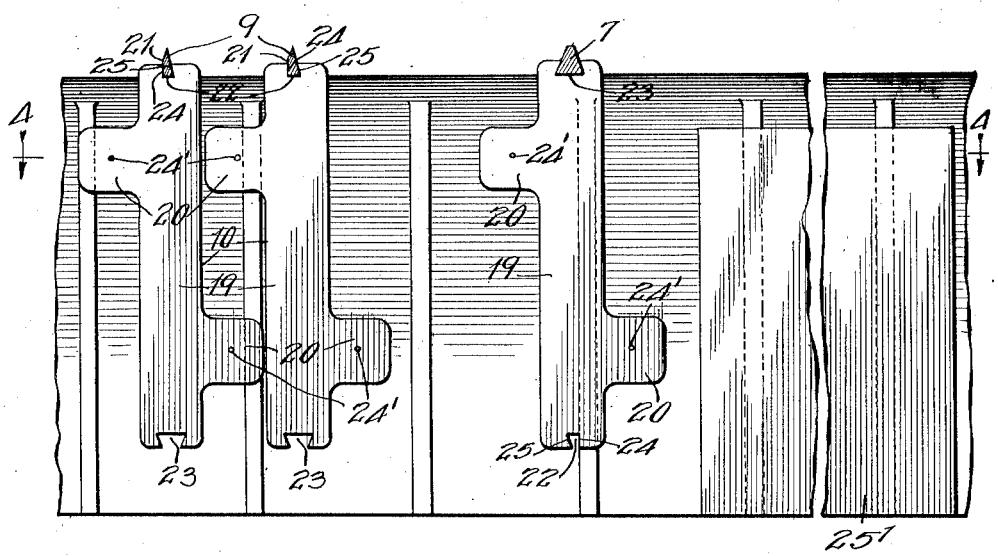
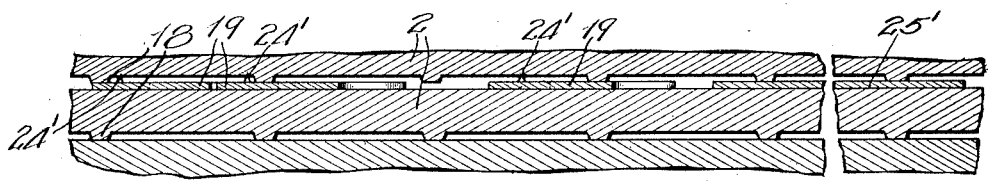
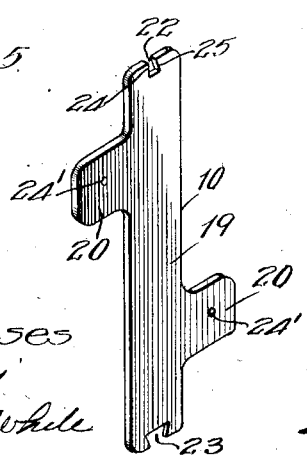
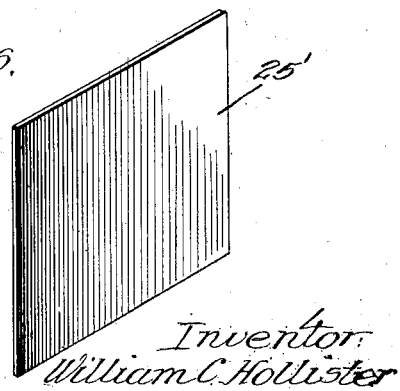
Witnesses
W. F. Kilroy
Harry P. L. White
Inventor
William C. Hollister
By Edward Jay Wilson Atty

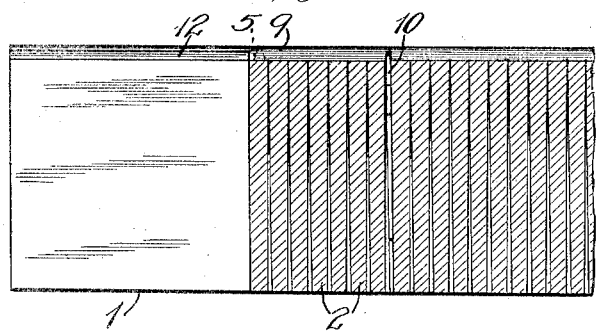
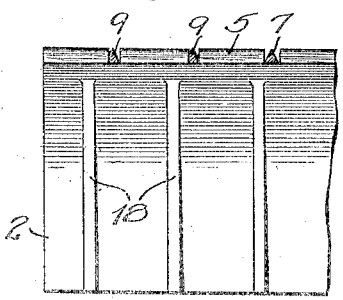
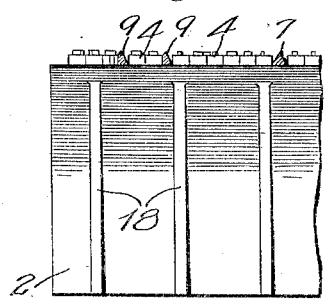
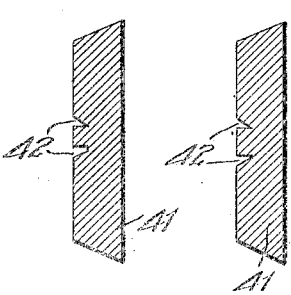
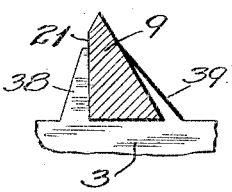
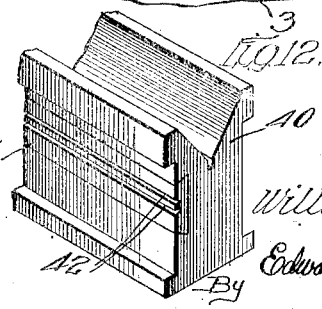

W. C. HOLLISTER.
RULED LINOTYPE FORM AND MEANS FOR PRODUCING SAME.
APPLICATION FILED JAN. 29, 1918.
1,349,720.
Patented Aug. 17, 1920.
4 SHEETS—SHEET 4.
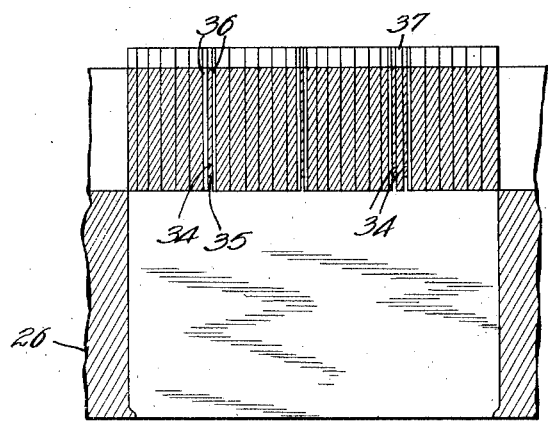
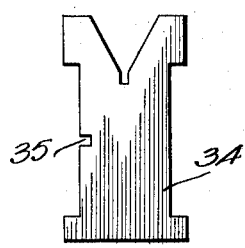
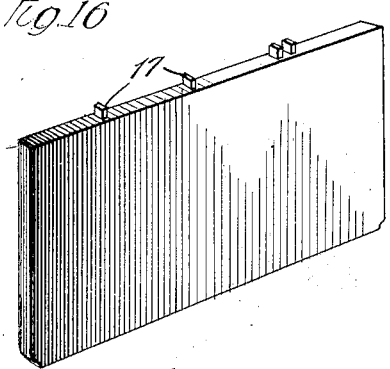
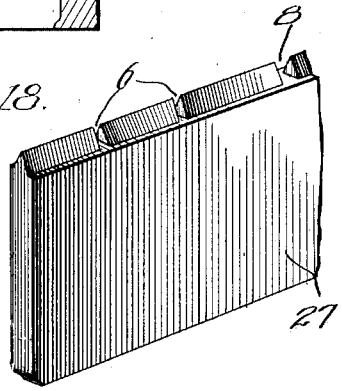
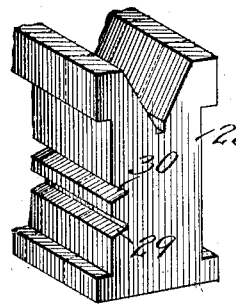
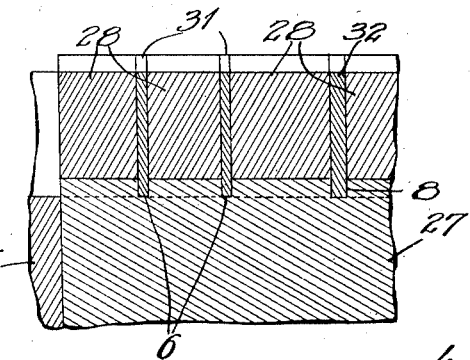
Witnesses
W. F. Kilroy
Harry R. L. White
Inventor
William C. Hollister
By Edward Jay Wilson
Atty.

UNITED STATES PATENT OFFICE.

WILLIAM C. HOLLISTER, OF CHICAGO, ILLINOIS.

RULED LINOTYPE-FORM AND MEANS FOR PRODUCING SAME.

1,349,720.   Specification of Letters Patent.   Patented Aug. 17, 1920.

Application filed January 29, 1918. Serial No. 214,379.

*To all whom it may concern:*

Be it known that I, WILLIAM C. HOLLISTER, a citizen of the United States, and resident of Chicago, Cook county, Illinois, have invented certain new and useful Improvements in Ruled Linotype-Forms and Means for Producing Same, of which the following is a specification.

My invention relates to the printing art and has special reference to the ruling of type forms.

The object of my invention is to provide a system of ruling type forms, particularly applicable to forms composed of type bars or linotype slugs, whereby wire-like rules can be easily, quickly, accurately and securely fastened in place upon the level top surface of the form, and providing printing edges in the plane of the printing face of the form.

A further object of my invention is to provide simple and effective means for ruling type forms composed of linotype slugs, some of which are arranged vertically in reference to the body of the form, the rules being secured both to the main body and the vertically extending slugs.

A further object of my invention is to provide a system for ruling printing forms composed of type bars or linotype slugs, which shall involve the use of but very simple matrices for use in linotype machines.

A further object of my invention is to provide a system for ruling type forms composed of type bars or linotype slugs, which shall be very simple in its application and use, which will not involve the production of openings having overhanging side walls; by means of which vertically extending rules can be arranged and held in position upon the form at closely spaced intervals; by means of which close figure work can be easily and quickly provided with vertical extending rules; and in the use of which but very simple and inexpensive devices are necessary.

My invention consists in a ruled type form composed of type bars or linotype slugs, having triangular shaped wire-like rules secured upon its level top surface, unique anchors extending down between adjacent slugs holding the rule against vertical movement, and rigid lugs or projections on the slugs for holding the rules against relative lateral movement.

My invention also consists in the combination of a printing form composed of linotype slugs or bars, of rule anchors adapted to be received between adjacent slugs and adapted to hold small triangular shaped wire-like rules on the level top surface of the form, the anchors being adapted to span the fitting ribs on the linotype slugs and adapted to hold rules on the form, the spacing of which is less than the spacing of such ribs.

My invention also consists in an anchor for holding small wire-like rules on printing forms, composed of linotype bars or slugs, such anchors so formed that when placed between two adjacent linotype slugs in a printing form they will be engaged by one or more of the vertical extending ribs on one of said slugs and adapted to permit the placement of an adjacent anchor to hold an adjacent and parallel rule at a distance from the first rule, which is less than the spacing of such ribs.

My invention also consists in a rule anchor having an opening in one end for receiving and holding one form of rule, and an opening in the opposite end for receiving and holding another form of rule.

My invention also consists in the several combinations and arrangements of structures, devices and parts by which I am enabled to attain the above described and other objects and all as hereinafter described and particularly pointed out in the appended claims.

My invention will be more readily understood by reference to the accompanying drawings forming part of this specification, and in which:—

Fig. 3 is an enlarged fragmentary transverse section on the line 3—3 of Fig. 1;

Fig. 4 is a horizontal fragmentary section on the line 4—4 of Fig. 3;

Fig. 5 is a perspective elevation of one of the anchors;

Fig. 6 is a perspective view of a filler for use with the anchors;

Fig. 7 is a vertical section on the line 7—7 of Fig. 1;

Fig. 8 is a fragmentary transverse vertical section on the line 8—8 of Fig. 1;

Fig. 9 is a transverse vertical section on the line 9—9 of Fig. 1;

Fig. 10 is an enlarged fragmentary section on the line 10—10 of Fig. 1;

Fig. 11 is an enlarged fragmentary section on the line 11—11 of Fig. 1;

Fig. 12 is a fragmentary perspective elevation of a block for use in a linotype machine for producing rule holding ribs;

Fig. 13 is an enlarged vertical section of the slide shown in Fig. 12 and taken on the line 13—13;

Fig. 14 is a similar sectional view of a slide for producing the rule holding projections shown in Fig. 10;

Fig. 15 is a horizontal fragmentary section of a linotype mold showing a line of matrices in relation thereto arranged for casting rule guide projections;

Figure 1:
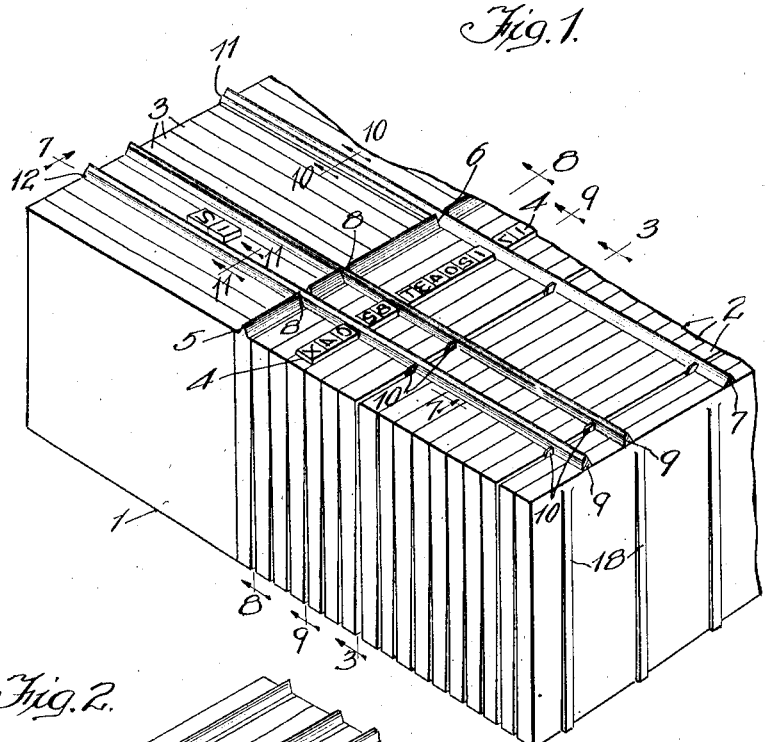
Figure 1 is a fragmentary perspective view of a type form having transversely and vertically extending type bars and provided with vertically extending rules, the whole illustrating one embodiment of my invention.

Fig. 15$^a$ is a plan elevation of a special lug forming matrix;

Fig. 16 is a perspective view of a slug such as would be cast in the arrangement shown in Fig. 15;

Fig. 17 is a fragmentary horizontal section of a linotype mold arranged for casting a slug having a line printing projection thereon provided with rule receiving openings;

Fig. 18 is a fragmentary perspective view of a slug such as would be cast in the arrangement shown in Fig. 17; and Fig. 19 is a perspective view of a special matrix adapted for casting line printing projections on linotype slugs.

Heretofore type form rules of the kind disclosed in this application have been held upon type forms principally by projections on the form itself, which were either of a shape to embrace the rule or could be bent to overhang the inclined sides thereof. Either of these methods involves the production of the rule receiving openings by special matrices or the punching of holes having overhanging side walls, for receiving the rules, by means of some form of punch or broach. In either of these it is necessary to accurately place these rule holding projections so that when the rule is placed thereby the rule will occupy its desired position. Furthermore it is necessary, when the holes having side walls adapted to overhang the side walls are used, to thread the rules endwise through the several holes which are provided in alinement. When the form is fairly large this is a slow and tedious process, especially when the rule receiving openings are close together longitudinally of the rule, for then the slight lack of alinement of the openings prevents the easy placement of the rule. On the other hand, when the bendable lugs are used they must be very small and thin and are easily broken, especially by careless workmen, and this may result in the loosening of the rule on the press followed by possibilities which may result in great damage and loss.

By means of the present invention I avoid the above mentioned and many other difficulties.

The only preparation which it is necessary to make for the practice of my present system is to provide some means of locating the rule at the point desired. This may be either notches in cross rules, either printing or non-printing, or figure or character bases, when these are in proper positions to be used, or small guide projections. With all of these forms of rule guides it is not a necessity that they be in dead accurate alinement, particularly when they are spaced apart sufficiently, longitudinally of the rule, as the rule being of small cross section is sufficiently yieldable or flexible to follow the guides. Also in each form of guides the rule does not need to be threaded through the guides but simply laid down upon the form in position between the guides, as I have provided very simple anchor or holding members for securely holding the rule on the form.

Before placing the rule upon the form between the guides I first string a number of anchors upon the rule and roughly space them to correspond with the positions on the form in which I wish the anchors to be. Then I spread the form apart to provide openings between adjacent slugs to receive the anchors and place the rule down on the form, lowering the anchors between the slugs and then by pressing the slugs of the form together, as when the form is locked in a chase, I tightly hold the anchors between the adjacent slugs.

This system lends itself most readily to the making of corrections, etc., in the forms as any slug can be easily removed and a new slug can be readily inserted, and there is no necessity of any absolute accuracy in the placing of the lugs or projections upon the new slug.

In said drawings 1 illustrates a ruled type form made up of linotype slugs or type-bars 2 which extend transversely or across the form to print horizontal lines, and vertically extending slugs or type-bars 3 extending at right angles to the slugs 2 and arranged to provide a heading for a tabulated page. I have illustrated only a few of the figure characters 4 but it will be understood that substantially all of the slugs 2 carry these characters. Some of the transverse or horizontal slugs may be provided with ribs 5 on their upper edges for providing horizontal lines on the page to be printed. I provide notches or openings 6 in these ribs to receve the rules 7 and notches 8 to receve the rule 9.

I hold the rules on the form by means of anchors or rule holders 10 which are very thin and are received and bound between the slugs 2. In this class of type form when the vertical rules are relatively close together, it is sometimes necessary to place some explanatory matter in the heading and it is desirable to run the rules 7 and 9 up through the heading. The rules being close together makes it necessary to provide slugs 3 as shown running vertically with respect to the form and carrying the necessary explanation. When this is the case, I extend the vertical rules through the heading and provide special slugs 11 and 12 for securing these portions of the rules to the form. I thus provide the form with continuous vertical rules which extend through the lower part of the form and through the heading also, and I avoid the usual break in these lines at the cross rule 5.

Figure 2:
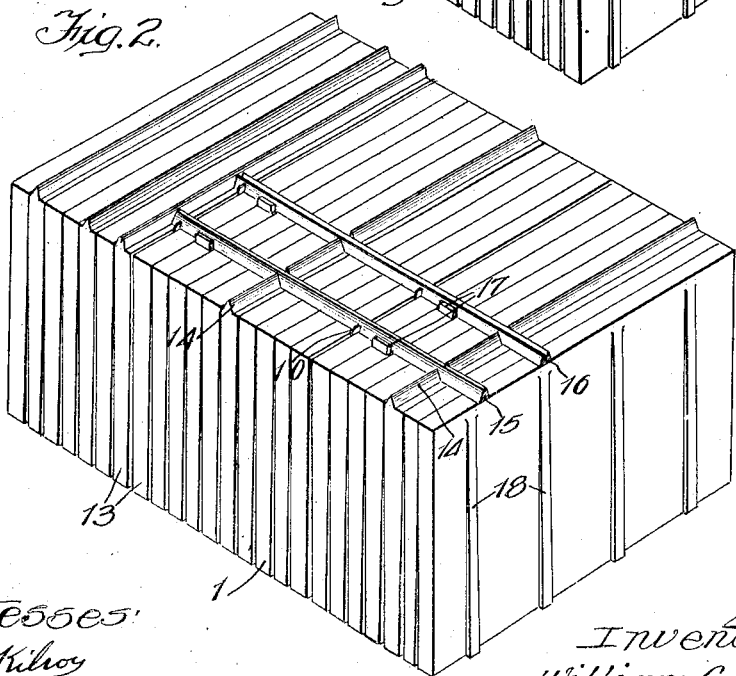
Fig. 2 is a perspective elevation of a linotype blank form embodying my invention.

In Fig. 2 I have illustrated what may be termed a blank form, viz: a form for printing blanks such as bank deposit slips and the like.

This form is composed of transverse or horizontal slugs 13 some of which may be provided with longitudinal ribs 14 similar to the ribs 5 and provided with notches for receiving vertical rules 15 and 16 which, like the rules 7 and 9, are adapted to be held upon the level top surface of a form and be secured thereon by means of the anchors 10. As in forms of this kind the horizontal lines are frequently spaced widely apart I provide guide projections 17 on slugs spaced between the ribs 14 to hold the rules laterally on the form at such points, or to guide the workman in placing the rules on the form, and I use as many of the anchors 10 on each rule as may be necessary to properly hold the rule on the form.

The usual or ordinary linotype slug is provided on one face with fitting ribs 18 which extend from practically the upper edge to the lower edge of the slug, that is, they are vertical. They are, as made in the standard linotype machine, spaced about three-eighths of an inch apart center to center.

As the body of the slug is cut out between the ribs 18, it is necessary that the anchors 10 be bound between the ribs 18 and the plain face of the adjacent slug, or they might not be held tightly in the form, and yet it sometimes occurs that it is necessary to space the rules upon the form closer together than the spacing of these ribs 18.

For the purpose of providing a closer spacing of the form rules than the spacing of the ribs 18, and yet cause the anchors to be tightly bound between the slugs, I preferably make the anchors of a peculiar shape. The anchors 10 consist of a narrow elongated body portion 19, which is considerably narrower than the space between the ribs 18, and I provide this narrow body with laterally extending projections 20, one adjacent to one end and extending laterally in one direction, and the other adjacent to the other end and extending laterally in the opposite direction. This construction permits the close arrangement or nesting of the anchors, as shown in Fig. 3, and the placement of the rules transversely of the form closer together than the spacing of the ribs 18. Furthermore the anchors 10 are so very thin, being only a few thousandths of an inch thick, that they might, in some instances, be overlapped without doing any harm.

The rules 7, 9, 15 and 16 are of substantially triangular cross section, each having a relatively broad base and a relatively narrow printing edge.

The rule 7 is substantially an equilateral triangle. The rule 9 is similar to rule 7, but with one side edge cut off, making the body considerably narrower and provided with one vertical side face 21. This rule 9 is particularly adapted for what is known as close figure work, where the line to be printed is arranged very close to the printing characters. In making the notches 8 in the cross rules to receive the vertically extending rules, I make the notches just wide enough to receive the rules to be used, consequently by the use of the rule 9 I am enabled to make a very close joint on one side between the line imprinted by the rule 9 and that imprinted by the cross rule, as the cross rule can butt against the vertical side face 21 of the rule 9.

In making the anchor 10 I provide a notch 22 in one end to fit the narrow rule 9 and a wider notch 23 in the other end to fit the other forms of rule, the bases of which are uniform in width. The notch 22 is not as deep as the rule 9 and is provided with one vertical wall 24 and one overhanging wall 25. The notch being of less depth than the height of the rule, the upper end of the anchor can not rise to the printing face of the form and the notch 22 practically fits the rule 9 so that the anchor, once being placed upon the rule, can only be removed by sliding it to the end of the rule. I make the notch 23 fit the wider base of the rule 7, that is, each side wall thereof is arranged to overhang the inclined side wall of the rule and which, like the other end, must be placed upon the rule from the end and removed in the same way.

The anchors are of less length from top to bottom than the depth or height of the slugs, consequently their lower ends do not reach to the bottom of the form when they are in operative position, as shown in Fig. 3.

Once the form is clamped tightly in the chase the rules are securely held and retained in position. In closing a form the practice is to gradually close the form until the anchors are held with sufficient friction to hold them where placed. Then the rules and anchors are finally pressed down to cause the rules to rest solidly upon the level top surface of the form and then the form is completely closed.

It sometimes occurs that it is necessary to unlock or open the form after it has been closed, and I have found that when the rules are not exactly straight they will spring up and need to be again pressed down into place when the form is again closed. To eliminate this difficulty I provide small sharp projections 24 on the anchors adapted to be pressed into one of the type slugs between which the anchor is held. These projections are very sharp and small and are slightly longer than the thickness of the ribs 18, so that even if the projections happen to be positioned between the ribs 18, they will engage the slug sufficiently to hold the anchors in place. I prefer to arrange these projections 24 on the arms 20 of the anchors by forming them by means of a prick punch tool, forcing the metal out as shown.

When the form is unprovided with vertical rules at one side the type slugs would not be solid at such part due to the spreading of the type-bars by the anchors on the other part of the form. To make the form equally solid at all parts I provide fillers 25 which are small rectangular pieces of the thin metal of which the anchors are made and I place these between the slugs at points where no anchors are used.

In Fig. 17 I have illustrated a mold 26 of a linotype machine in relation to a line of matrices arranged to produce one of the cross rule slugs 27 which are provided with the rule receiving openings or notches 6 and 8.

I provide special matrices 28 which I provide with rule casting grooves 29 and 30, one of which, 29, is adapted to form a black face or wide rule, and the other, 30, to form a hair line rule. As indicated by the dotted lines on the matrix 28, I make these matrices of various lengths, indeed I make these matrices in sets varying in width from six points to thirteen points by points, that is, 6, 7, 8, etc., increasing by single points, and I provide wider matrices of 18, 24, 30 and 36 points width so that I am enabled to produce a cross rule of any desired number of points from six points up. These matrices lend themselves to the provision of the rule receiving notches in the desired places or spaced to produce the desired spacing of the vertical rules for I place between the rule line matrices blank matrices 31 thick enough to form the notches 6 and thicker matrices 32 to form the notches 8. I can, by selecting the matrices 28 and properly combining them, produce any desired spacing of the rule receiving notches and provide a cross rule which will best combine with the vertical rules to produce a ruled page in which the horizontal and vertical lines shall be closely joined.

In Fig. 15 I have illustrated a mold 26 and a line of matrices for producing the rule guide projections 17. In this case a sufficient number of blank matrices of suitable thickness are assembled to produce the blank surfaces of the slug between the projection 17, and for producing the projections I arrange a thin matrix 34 in the line of matrices. This matrix is provided with a notch 35 in one edge, and I assemble with this matrix a thin blank matrix 36, one at each side, which blank matrices close the sides of the notch 35 and produce a pocket adapted to cast one of the projections 17 on a slug formed in the mold 26.

In producing a slug of this kind I usually provide a single projection where I use the rule 9 and two associated projections when I use the wider base rule 7.

To produce the pair of spaced projections for the wider rule 7 I arrange two of the matrices 34 spaced apart by a blank matrix 37 of a thickness sufficient to provide the proper distance between the projections, as shown in Fig. 16.

For the purpose of securing the vertical rules on the vertical slugs 3 of the heading I provide means for making rule holding ribs 38 and 39 on the vertical slugs. The ribs 38 are rigid and are adapted to contact with the flat side 21 of the rule 9, and the rib 39 is thin and bendable and is adapted to be bent down upon the inclined face of the rule 9.

To hold the rule 7 in place I make both the ribs between which it is placed the bendable kind, spaced apart to receive the rule 7 between them.

To make slugs of this kind provided with these longitudinal ribs I provide a matrix block 40 in one face of which I mount a removable member 41 provided with longitudinal grooves 42 of a form to make the kind of ribs desired, either two bendable, as shown in Fig. 14, or one bendable and one rigid, as shown in Fig. 13.

In ruling a form of the kind shown in Fig. 1 the form having been prepared ready for the rules, I cut the rules of the proper length to extend from the top to the bottom of the form. Then I string onto the rule a sufficient number of the anchors to properly hold it upon the main or lower part of the form. Then I separate the horizontal slugs sufficient to admit the several anchors, and I lay the rule in place in the notches in the several cross rules and between the projections in the vertical slugs. After all the rules have thus been placed I press the slugs together in a proper chase, and firmly press the rules down upon the level top surface of the form as the form is closed. Then I form the bendable ribs 39 down upon the inclined sides of the rules in the heading.

I now have a form which is provided with vertical rules which extend between the tabulated matter and up into the heading without a break at the joint between these two parts. The rules are held firmly in position and cannot work loose in the operation of the press, and cause damage.

These rules and anchors can readily be removed and separated from the slugs when it is desired to remelt the slugs as is the common practice, and the rules and anchors can be used over again.

The only special matrices required are those for making the cross rules, the notches in the rules and the rule guide projections, and those may all be dispensed with in work when the bases of the figure characters are so placed as to form the guide projections for the rules. When there are no cross rules and the figure bases form the rule guide projections there is no need of any other device than the few small anchors.

In providing the vertical slugs which have the rule holding ribs on them, I prefer to make them of full or thirty ems length and cut them to such lengths as are needed to build up or make the heading portion of the form.

As many modifications of my invention will readily suggest themselves to one skilled in the art, I do not limit or confine my invention to the exact steps or to the specific structures herein shown and described.

I claim:—

1. A ruled type form comprising a type form composed of type-bars which are provided on one side with horizontal spaced, vertical fitting ribs, said form having a level top surface below the printing face thereof, rules arranged transversely with respect to the type bars resting on and supported by said top surface, rule anchors of a width greater than the distance apart of said fitting ribs engaging said rules and formed with transversely overlapping parts adapting them to be nested together to hold rules more closely spaced than said ribs, said anchors depending between adjacent type-bars and adapted, when the type bars are pressed toward each other, to hold said rules upon the form.

2. A ruled type form comprising a form composed of type-bars having a level top surface below the printing face thereof, rules resting on said top surface and arranged transversely of said type bars, rule guide projections on the form against which said rules are adapted to be placed, anchors of less length than the depth of the type-bars adapted to depend between adjacent type bars and to be held thereby, said anchors having relatively narrow rule engaging ends and relatively wider body portions.

3. An anchor for use in securing printing rules upon the level top surface of linotype forms, said anchor having an elongated body, a narrow mouthed opening in one end of said anchor for engagement with a rule, lateral projections on said anchor between its ends arranged to nest with similar anchors placed alongside to permit the placement of rules on a form closer together than the extreme width of said anchors.

4. An anchor for securing a rule upon the level top surface of linotype forms, said anchor having an opening at one end centrally located in relation to the extreme width of the anchor and adapted to depend between adjacent slugs to hold a rule upon the level top surface of a type form.

5. A rule anchor for holding printing rules upon the level top surface of type forms, said anchor having a rule engaging opening in its end and provided with projections for engaging the side face of an adjacent slug to prevent the rising of the rule even when the adjacent slugs between which the anchor is placed are not pressed tightly together.

6. A rule anchor for holding a printing rule upon the level top surface of linotype forms having a narrow mouthed opening in one end for receiving and holding a rule and provided with needle-like projections on its body portion adapted to be pressed into the body of an adjacent slug when the slugs are pressed together.

7. An anchor for placement between two adjacent type-bars for holding a printing rule upon the level top surface of a linotype form, said anchor provided with an opening in each end for receiving and engaging line printing rules, the two openings being adapted to engage rules of different cross-sectional forms.

8. A ruled type form comprising a type form composed of type-bars and having a level top surface below the printing face thereof, rules arranged transversely with respect to the type-bars resting on and supported by said level top surface, relatively thin anchors interlocked with said rules and depending between said type-bars, and a filler of like thickness with said anchors for placement between slugs in line with the anchors to hold adjacent slugs in proper parallel relation.

In testimony whereof, I have hereunto set my hand this 18th day of January, A. D. 1918.

WILLIAM C. HOLLISTER.